(12) United States Patent
Horch

(10) Patent No.: US 10,023,007 B2
(45) Date of Patent: Jul. 17, 2018

(54) WHEEL SKIRT FOR LOCKABLE CASTER AND METHODS OF MAKING

(71) Applicant: Action Target Inc., Provo, UT (US)

(72) Inventor: Chad Horch, Lehl, UT (US)

(73) Assignee: Action Target Inc., Provo, UT (US)

( * ) Notice: Subject to any disclaimer, the term of this patent is extended or adjusted under 35 U.S.C. 154(b) by 0 days.

(21) Appl. No.: 15/398,543

(22) Filed: Jan. 4, 2017

(65) Prior Publication Data

US 2017/0190212 A1    Jul. 6, 2017

Related U.S. Application Data

(60) Provisional application No. 62/275,694, filed on Jan. 6, 2016.

(51) Int. Cl.
*B60B 33/00*    (2006.01)

(52) U.S. Cl.
CPC ...... *B60B 33/0049* (2013.01); *B60B 33/0086* (2013.01); *B60B 2310/30* (2013.01)

(58) Field of Classification Search
CPC ... Y10T 16/207; Y10T 16/216; Y10T 16/184; B60B 33/00; B60B 33/0002; B60B 33/006; B60B 33/0049; B60B 33/0086; B60B 7/00; B60B 7/06; B60B 7/061; B60B 2900/212; B60B 2900/551; B60B 2310/30; A47B 91/00; A47B 91/12; A47B 2095/046; A47B 95/043; A47C 19/024
See application file for complete search history.

(56) References Cited

U.S. PATENT DOCUMENTS

| | | | | |
|---|---|---|---|---|
| 1,998,236 A | * | 4/1935 | Herold | B60B 33/021 16/35 R |
| 2,147,064 A | * | 2/1939 | Schultz, Jr. | B60B 33/021 16/35 R |
| 2,450,062 A | | 9/1948 | Voss et al. | |
| 2,471,958 A | * | 5/1949 | Humphreys | B60B 33/00 16/18 CG |
| 2,830,545 A | * | 4/1958 | Robinson | B60B 33/00 105/170 |
| 2,996,752 A | * | 8/1961 | Pope | B60B 33/0002 105/170 |
| 3,687,241 A | * | 8/1972 | Fontana | B60B 33/021 16/35 D |
| 3,744,080 A | * | 7/1973 | Smith, Jr. | B60B 33/00 15/256.51 |
| 3,942,608 A | * | 3/1976 | Frank | B60B 33/021 16/35 R |
| 4,025,099 A | | 5/1977 | Virden | |
| 4,449,268 A | * | 5/1984 | Schnuell | B60B 33/0078 16/35 R |

(Continued)

FOREIGN PATENT DOCUMENTS

| | | | | |
|---|---|---|---|---|
| DE | 2839344 A1 | * | 3/1980 | B60B 33/00 |
| EP | 0085984 A1 | * | 8/1983 | B60B 33/00 |

(Continued)

*Primary Examiner* — Chuck Mah
(74) *Attorney, Agent, or Firm* — Durham Jones & Pinegar; Randall B. Bateman; Tenley H. Schofield

(57) ABSTRACT

The present disclosure relates to caster wheels having a skirt, specifically a skirt which fits over one side of the wheel only, and thus does not interfere with the actuation of a caster wheel locking mechanism.

20 Claims, 5 Drawing Sheets

(56) References Cited

U.S. PATENT DOCUMENTS

| | | | | |
|---|---|---|---|---|
| 5,371,920 A | * | 12/1994 | Rainville | ................ B60B 33/00 |
| | | | | 128/203.12 |
| 5,615,450 A | | 4/1997 | Butler | |
| 5,675,864 A | * | 10/1997 | Chou | .................... B60B 33/021 |
| | | | | 16/35 R |
| 6,678,917 B1 | | 1/2004 | Winters et al. | |
| 8,910,344 B2 | | 12/2014 | Nguyen et al. | |
| 9,108,462 B1 | * | 8/2015 | Stone | ................. B60B 33/0023 |
| 2013/0097808 A1 | * | 4/2013 | Long | .................. B60B 33/0015 |
| | | | | 16/18 CG |

FOREIGN PATENT DOCUMENTS

| | | | | |
|---|---|---|---|---|
| JP | 58071203 A | * | 4/1983 | |
| KR | 20070099973 A | * | 10/2007 | |

\* cited by examiner

WHEEL SKIRT FOR LOCKABLE CASTER AND METHODS OF MAKING

FIELD OF INVENTION

The present invention relates to caster wheels having a skirt, specifically a skirt which does not interfere with the actuation of a caster wheel locking mechanism.

BACKGROUND

Casters are commonly used as wheels on a variety of appliances, devices, and tools to allow the appliance or tool to be moved about a variety of places. Many structures, such as shopping carts, chairs, tables, and various other types of machinery are mounted on caster wheels for ease of motion. The caster wheels of such devices are often equipped with locks or brakes, often in the form of a small pedal or lever. When the lever of a brake pedal is depressed, it engages with the caster wheel, thus preventing the wheel from turning and allowing the caster wheel to be locked in place.

While casters are highly desirable in that they can pivot about an axis point other than the axle of the wheel, one problem with casters is that they tend to be relatively small and can easily be interfered with by bolts, nuts and other debris which may have fallen on the floor. If the caster is suddenly engaged with such materials, the appliance, equipment, or device which is carried by the caster can tip over. When such a caster is used in a crowded work environment that includes cables, cords and hoses lying on the ground, the caster wheels often contact the objects on the floor. Because the diameter of the hoses or cables may be fairly large relative to the diameter of the caster wheel, the objects on the floor may prevent the continued rolling or turning movement of the snagged caster wheel, which prevents proper operation of the equipment. Additionally, even when the caster wheels are forced over such hoses or cables, it is possible that the contact between the caster wheels and the hoses or cables may result in damage, wear, or possible disconnection of the cables or hoses.

Alternatively, the obstruction may wedge between the caster and the floor and may be dragged some distance thereby damaging the floor. Thus, for example, a nut or bolt may leave large scratches in the floor or may snag or otherwise damage carpet.

The use of caster skirts is not new, and a number of wheel guards or shrouds have been developed. For example U.S. Pat. No. 5,615,450 shows a caster skirt which fits about the caster to prevent contact with nuts, bolts, screws, and the like.

Such caster skirts have drawbacks and disadvantages. For example, one problem with the embodiments shown in the '450 patent is that the caster skirt interferes with a locking mechanism which can be used to lock the caster in a given position when movement of the appliance or tool is not desired. Further, traditional caster skirts—which surround the wheel or are shaped as a yoke around the wheel—are vulnerable to certain types of debris such as string, which can become wrapped around both the caster portion and the skirt portion, thus jamming the caster wheel or preventing it from pivoting correctly until the string is cut free.

Thus there is a need for a caster skirt which does not interfere with the action of a locking mechanism or break, and which also provides some resistance to tangling by debris such as string, fine wire, or twine. Further, it is advantageous if the sweeping material of the skirt can be readily replaced or removed. Finally, it is advantageous if the caster skirt cannot rotate downwards, where the skirt itself may catch against the floor, causing the caster to snag or seize.

The various embodiments described by the present specification are described in greater detail below.

SUMMARY OF INVENTION

It is an object of the present invention to provide a skirt assembly which fits over a caster wheel in a manner that leaves one side of the wheel free to accept a locking or brake mechanism, and methods of making the skirt assembly.

The present disclosure includes different devices, systems, methods and applications which free one side of a caster wheel assembly to support locking devices of various kinds, and are thus applications of a common inventive concept. It should be appreciated that various devices, systems, methods and applications will have some benefits and may lack other benefits which are present in different devices, systems, methods and applications described herein. Therefore, the teachings of the present disclosure and any actual or intended benefit of any embodiments should not be read into the claims unless expressly stated therein.

In some embodiments, the caster wheel skirt includes a first arm portion with a stop tab and an axle attachment, the first arm portion being joined to or integrally formed with a second arm portion.

The second arm portion may have a transverse member at substantially right angles to the second arm portion, and may also include a skirting clamp.

In some embodiments, the skirting clamp comprises a ridged groove, and further comprises a skirting material, the ridged groove being adapted to releasably engage the skirting material.

In other embodiments, the skirt assembly includes a stop tab which has a width and a length, the stop tab width being less than approximately one half inch, and the stop tab length being less than approximately one half inch. It will be appreciated that larger embodiments may be created in order to fit to larger wheels, in which case the ratio of the stop pad width to the stop pad length may be approximately 1:1.

In still other embodiments, the skirt assembly further has a wheel axle, the wheel axle having a first end and a second end; and the axle attachment is adapted to releasably engage the wheel axle at only the first end.

In some embodiments, the transverse member of the skirt assembly is heavier or wider than the first arm portion.

In some embodiments, the transverse member and the stop tab are substantially parallel; and the first arm portion and the second arm portion are substantially co-planar.

In other embodiments, the lockable skirted caster wheel assembly may include: a caster wheel having a frame, a locking mechanism, and an axle; the axle having a first end and a second end; only the first end of the axle being engaged with an axle attachment; the axle attachment having a first arm portion and a second arm portion, the second arm portion being longer than the first arm portion; the first arm portion being adapted to engage the frame of the caster wheel; the second arm portion being bent to form a transverse member.

In certain embodiments, the lockable skirted caster wheel may form a half-yoke, in which the second arm portion and the transverse member meet at an angle of substantially ninety degrees, which may be a range between approximately 60-120 degrees. Alternately, the transverse member may meet the second arm portion in a curve.

In some embodiments, the lockable skirted caster wheel assembly may include a transverse member with a skirting holder, the skirting holder being affixed to the transverse member at an attachment point.

In some embodiments, the skirting holder may further comprise a skirting clamp.

In one aspect, the skirting clamp may include a ridged slot; and the skirting clamp further may include a skirting material, the skirting material having a bulbous side, the bulbous side being adapted to slide removeably into the ridged slot.

In another aspect, the skirting holder is curved, so as to hold the skirting material in a curved arc.

In still other embodiments, the skirting holder may meet the transverse member at a skirting angle, the skirting angle being more than about ten degrees. Because the skirting holder may not be quite parallel with the front edge of the caster wheel, debris may pushed off to one side where it may be easier to gather later, rather than being scattered to both sides.

In some aspects, the lockable skirted caster wheel assembly may include an axle attachment which is releasably attached to the axle.

In still other embodiments, the transverse member may be wider than the first arm portion.

Methods of making the skirted caster wheel assembly are also provided. In some embodiments, the method includes:

(a) providing a planar surface having a first arm portion having a distal tab and a second arm portion having a distal portion;

(b) positioning the distal portion of the second arm portion at an angle to the planar surface;

(c) positioning the distal tab of the first arm portion at an angle to the planar surface;

(d) forming an axle attachment at a juncture of the first and second arm portions;

(e) providing a wheel having an axle therethrough; the axle having a first end and a second end;

(f) engaging the first end of the axle with the axle attachment;

(g) providing a skirting holder and a skirting material;

(h) engaging the skirting holder with the distal portion of the second arm portion;

(i) engaging the skirting material with the skirting holder.

In other embodiments, the method may additionally include steps such as:

providing a wheel lock;
engaging the second end of the axle with the wheel lock;
providing a wheel frame;
selectively engaging the distal tab of the first arm portion with the wheel frame;
providing a skirting material; and
releasably engaging the skirting material with the distal portion of the second arm portion.

These and other aspects of the present disclosure may be realized in various lockable caster skirt systems and methods of use and manufacture as shown and described in the following figures and related description.

BRIEF DESCRIPTION OF DRAWINGS

Various embodiments of the present invention are shown and described in reference to the numbered drawings, wherein.

Figure 1:
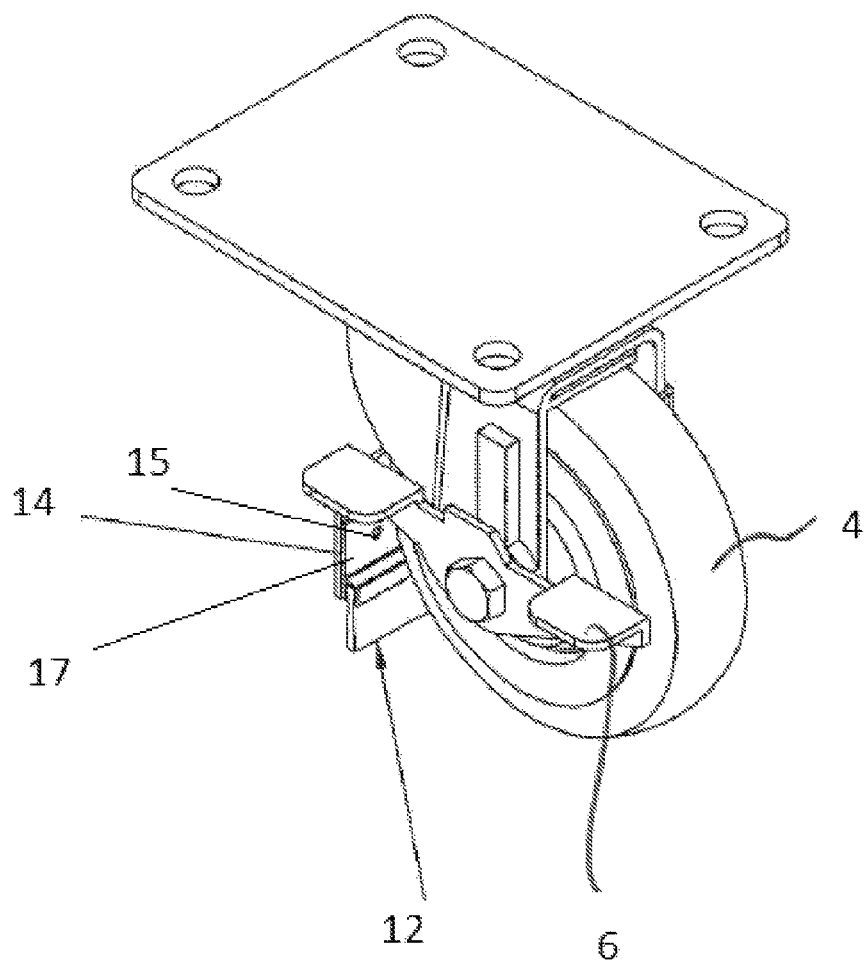
FIG. 1 shows a perspective, rear view of an embodiment of a lockable skirted caster assembly, including an embodiment of a locking mechanism.

It will be appreciated that the drawings are illustrative and not limiting of the scope of the invention which is defined by the appended claims. The various elements of the invention accomplish various aspects and objects of the invention. It is appreciated that not every element of the invention can be clearly displayed in a single drawing, and as such not every drawing shows each element of the invention.

DESCRIPTION

The disclosure and accompanying drawings are discussed below, using reference numerals to identify parts and features so as to enable one skilled in the art to practice the present invention. The drawings and descriptions are exemplary of various aspects of the invention and are not intended to limit or narrow the scope of the appended claims.

Furthermore, it will be appreciated that the drawings may show aspects of the invention in isolation and the elements in one figure may be used in conjunction with elements shown in other figures. The skilled artisan will understand that the methods described below can be practiced without employing these specific details, or that they can be used for purposes other than those described herein. Indeed, they can be modified and can be used in conjunction with products and techniques known to those of skill in the art in light of the present disclosure.

Reference in the specification to "one configuration," "one embodiment" "one aspect" or "a configuration," "an embodiment" or "an aspect" means that a particular feature, structure, or characteristic described in connection with the configuration may be included in at least one configuration and not that any particular configuration is required to have a particular feature, structure or characteristic described herein unless set forth in the claim. The appearances of the phrase "in one configuration" or similar phrases in various places in the specification are not necessarily all referring to the same configuration, and may not necessarily limit the inclusion of a particular element of the invention to a single configuration, rather the element may be included in other or all configurations discussed herein. Thus it will be appreciated that the claims are not intended to be limited by the representative configurations shown herein. Rather, the various representative configurations are merely representative examples and are provided to help one of ordinary skill in the art to practice the inventive concepts claimed herein.

Furthermore, the described features, structures, steps or characteristics of embodiments or aspects of the invention may be combined in any suitable manner in one or more embodiments. In the following description, numerous specific details are provided, such as examples of products or manufacturing techniques that may be used, to provide a thorough understanding of embodiments of the invention. One skilled in the relevant art will recognize, however, that embodiments of the invention may be practiced without one or more of the specific details, or with other methods, components, materials, and so forth. In other instances, well-known structures, materials, or operations are not shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect must be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a skirting material" may include one or more of such materials, and reference to "the layer" may include reference to one or more of such layers.

As used herein, the term "substantially" or "generally" refers to the complete or nearly complete extent or degree of an action, characteristic, property, state, structure, item, or result to function as indicated. For example, an object that is "substantially" enclosed would mean that the object is either completely enclosed or nearly completely enclosed. Likewise, a reference that something is generally perpendicular would mean that the object is sufficiently perpendicular to carry out a particular function. The exact allowable degree of deviation from absolute completeness may in some cases depend on the specific context, such that an enclosure encircling nearly all of a wheel would be substantially enclosing, even if one side of the enclosure had a slit or channel formed along a portion thereof. The use of "substantially" and "generally" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The invention and accompanying drawings will now be discussed in reference to the numerals provided therein so as to enable one skilled in the art to practice the present invention. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

With reference to FIG. 1, there is shown a perspective, rear view of an embodiment of a lockable skirted caster assembly, including an embodiment of a locking mechanism 6. In the present embodiment, a pedal-type of locking mechanism is shown, but it will be appreciated that any type of locking or brake mechanism may be used, including types actuated by a pedal or lever. In the present embodiment, when the locking mechanism 6 is depressed, the locking mechanism 6 engages the wheel 4, frictionally halting its rotation. Many other braking methods are possible, such as drag, electronic, or magnetic, and the locking mechanism 6 may engage instead with the ground or the wheel axle. Most such locking mechanisms 6 are actuated by foot, however, others may be actuated by hand, by rapid turning of the wheel (e.g. automatically stopping a runaway cart), or electronically (e.g. to prevent removal of shopping baskets from a grocery store parking lot.) Regardless of type, such brakes usually occupy one side of a caster wheel 4, as shown in FIG. 1.

Also shown in FIG. 1 is one embodiment of a transverse member 14, which holds a skirting material, sweep, or guard 12. The transverse member is positioned so as not to be engageable by the locking member 6. The skirting material 12 may be formed of a number of different materials depending on the application, including rubber, plastic, brushing fibers, or a material with semi-flexible characteristics in order to provide some give when encountering an obstruction.

As shown in FIG. 1, the skirting material 12 may also be mounted behind the transverse member 14, thus placing the skirting material 12 closer to the wheel. One advantage of this configuration is that encountered objects or litter are more likely to be deflected upwards and outwards, rather than jumping over the top of the transverse member 14 where they might interfere with the movement of the caster wheel 4.

The transverse member 14 may be adapted to engage or hold the skirting material 12 directly, or the transverse member 14 may instead engage with a skirting holder or sweeping mechanism 17. The skirting holder 17 and the transverse member 14 may connect together via screws (not shown) placed through holes 15, or via any other releasable means known to one of skill in the art. The pictured embodiment enables a user to select a type of sweeping mechanism 17 suited to his or her needs—including one which holds the skirting material 12 at an angle, or one which is curved or angled.

The pictured embodiment also enables a user to mount the skirting material 12 behind or in front of the transverse member 14, as required. This dual construction method (releasably attaching the skirting holder 17 to the transverse member 14) reduces costs of construction and improves the ease of maintenance and part replacement, but it will be appreciated that in some embodiments the sweeping mechanism or skirting holder 17 and the transverse member 14 may be instead formed integrally as one piece, or welded or otherwise irreversibly attached together, as required for any particular application. Additionally, the skirt may be attached directly to the transverse member using the holes 15 (FIG. 3).

Figure 2:
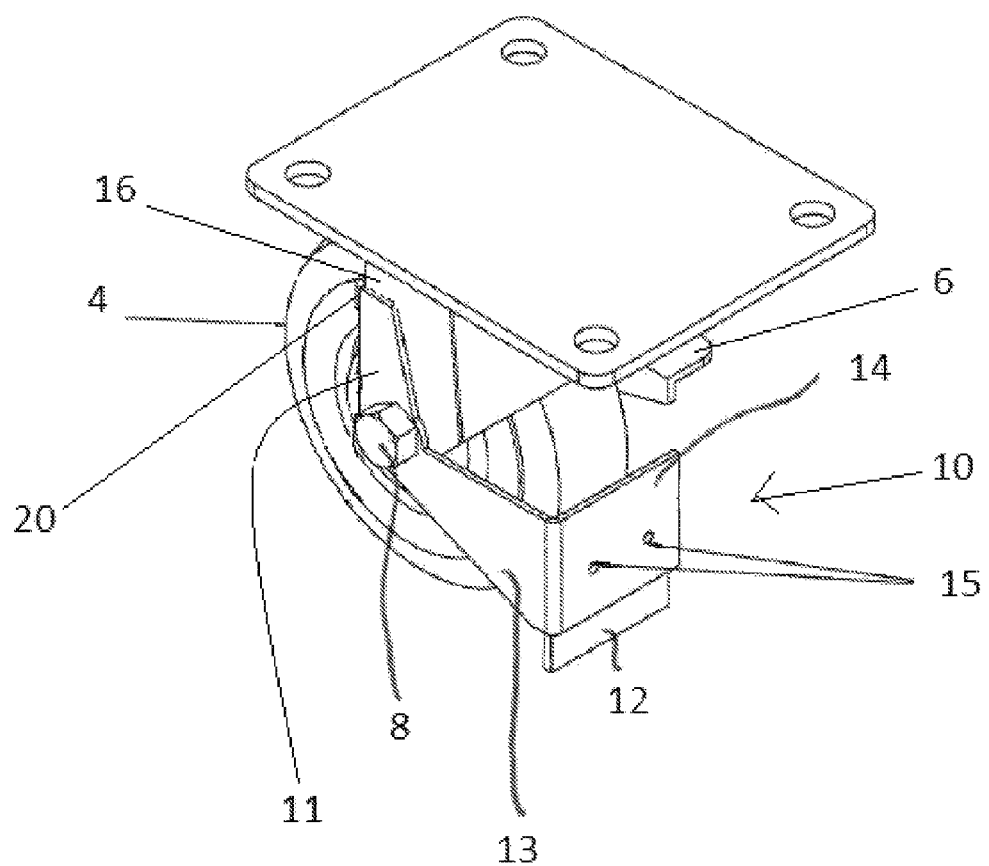
FIG. 2 shows a perspective, front view of an embodiment of a lockable skirted caster assembly.

Turning now to FIG. 2, there is shown a perspective, front view of an embodiment of the lockable skirted caster assembly of FIG. 1. The locking mechanism 6 can be seen on the far side of the wheel 4. In this perspective, the caster skirt or half-yoke, indicated generally at 10, can be more fully viewed. One specific advantage of the present invention is that it protects the area in front of the caster wheel 4 without interfering with actuation of the locking mechanism 6, because the half-yoke does not fully surround the wheel 4.

Figure 3:
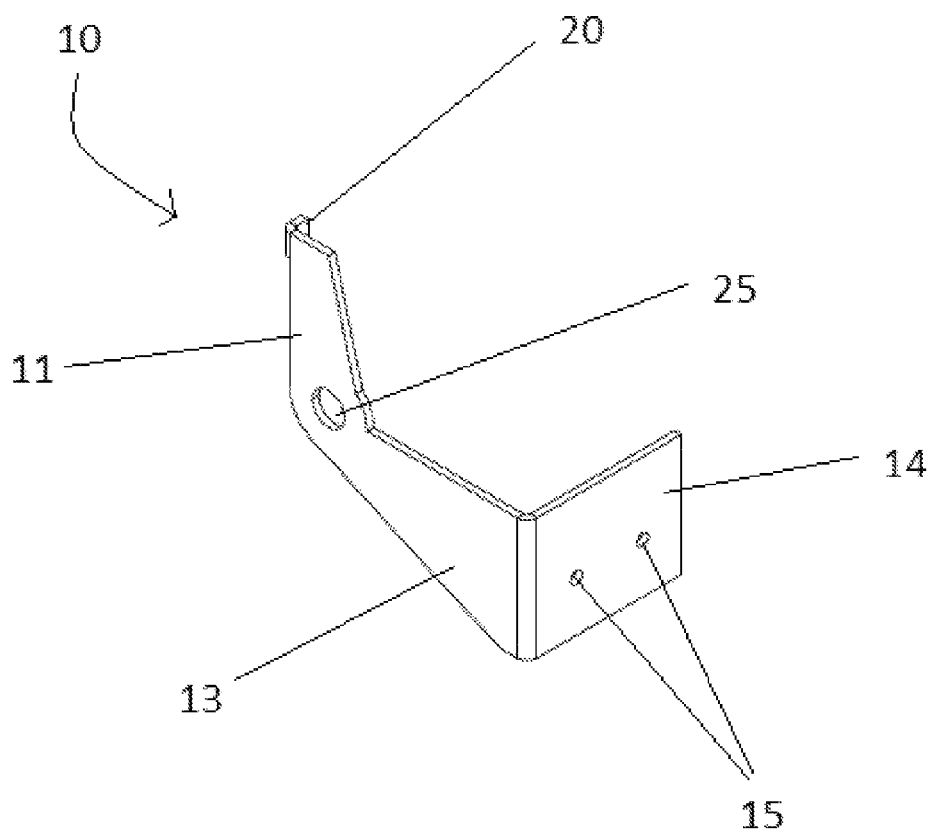
FIG. 3 shows a perspective, front view of an embodiment of a caster half-yoke.

The caster skirt 10 includes a first arm portion 11 and a second arm portion 13, a transverse member 13, a skirting material 12, and a rotational stop 20 (shown more clearly in FIG. 3.) The caster skirt 10 may further include a skirting holder or sweeping mechanism 17 (FIG. 1), however it is mounted behind the transverse member 14 in the present embodiment, and has been omitted for clarity.

The caster skirt assembly 10 is mounted to the frame 16 which holds the caster wheel 4 via the axle (represented by screw or bolt 8) of the caster wheel 4. The first arm portion 11 of the caster skirt 10 extends along the frame 16, while the second arm portion 13 extends outwardly from the axle. One advantage of the present embodiment is that, thus mounted, the caster skirt 10 swivels with the wheel, so that the skirting material 12 faces the direction in which the wheel will move. This swiveling action ensures that the skirting material 12 need not extend all the way around the caster wheel.

The first arm portion 11 which extends along the frame 16 is, in this embodiment, equipped with a stop or rotational stop or stopping tab 20, which is discussed in more detail in FIG. 3. The second arm portion 13 supports the transverse member 14, which may contain mounting holes or skirting attachment points 15 for the attachment of skirting material 12 or skirting holder 17 (omitted for clarity.)

Turning now to FIG. 3, there is shown a figure of one embodiment of a caster skirt assembly 10 in which the wheel and skirting material have been omitted. Also shown is the axle or axis attachment portion 25, which may be, for example, an opening through which a screw or bolt can extend. Any other releasable means of affixing the caster skirt 10 to the wheel axis may be used, or alternately, the caster skirt assembly 10 may be permanently affixed to the caster wheel.

In certain embodiments, the stop tab 20 allows the caster skirt to be raised, but not lowered past the point at which the stop tab 20 engages the frame 16 (FIG. 2.) In the pictured embodiment, it will be appreciated that when a bolt 8 (FIG. 2) is used to affix the caster skirt 10 to the wheel 4 (FIG. 2), an object such as a slope may press up on the casting skirt, causing the transverse member 14 to lift and the first arm portion 11 to pivot backwards. In such an instance, a user may easily return the caster skirt 10 to its ready position by stepping or pressing on the upper edge of the transverse member 14.

The user is prevented from accidentally rotating the caster skirt 10 too far downwards by the stop tab or rotational stop 20, which fits against and engages the frame 16 (FIG. 2). Likewise, a user may manually lift the caster skirt 10 by applying upwards pressure under the skirting material 12 (FIG. 2) or transverse member 14, thus disengaging the action of the caster skirt 10. The caster skirt 10 may be returned to ready position as above described. This adjustment range for the skirt may be advantageous if, for example, the user must roll the casters over thick carpet or up slopes or ramps.

However, in other embodiments the stop tab or rotational stop 20 extends down a length of the first arm portion 11. In such embodiments, the stop tab or ridge 20 substantially prevents the caster skirt from either being raised or lowered. This may be advantageous if, for example, the user anticipates encountering many heavy obstacles or pieces of litter, which might otherwise jolt the transverse member 14 upwards.

In some embodiments, the same advantage may be obtained by affixing the caster skirt 10 to the wheel axle (not pictured) via a bolt (FIG. 2) which may be tightened or loosened at will. When the bolt is tight, the caster skirt 10 is held frictionally against the frame 16 (FIG. 2) and cannot be substantially raised or lowered. When the bolt is loosened, the caster skirt 10 may gain some range of motion, to the limits of the stop tab or ridge 20.

In some embodiments, either or both of the transverse member 14 or the second arm portion 13 may be wider and heavier than the first arm portion, thus tending to keep the skirting material (FIG. 2) engaged with the floor, and tending to prevent small pieces of debris from jouncing the transverse member 14 upwards.

In some embodiments, the caster skirt assembly 10 is generally formed from a single piece of metal with the exception of the skirting material, minimizing the number of crevasses in which problematic obstacles such as string or twine might get wound.

In some embodiments, the first 11 and second 13 arm portions are positioned in the same plane, with the transverse member 14 forming a substantially right angle from the arm portions. In further embodiments, the ratio of the length of the stop tab 20 and the length of the transverse member 14 is approximately 0.25 to 1.75.

Figure 4:
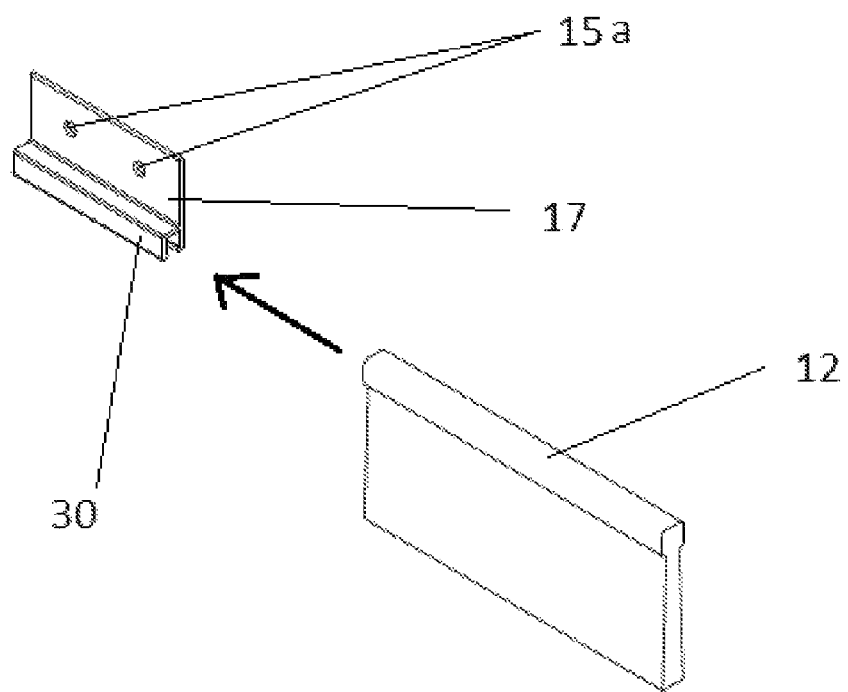
FIG. 4 shows a perspective view of an embodiment of a skirting holder or sweeping mechanism, and an embodiment of a skirting material positioned for installation in the transverse member.

Turning now to FIG. 4, there is shown a skirting holder or sweeping mechanism 17 and a piece of skirting or sweeping material 12. The skirting holder 17 may comprise transverse member attachment points or holes 15a, by which the skirting holder 17 may be attached to the transverse member 14 (FIG. 2, 3). It will be appreciated that this may be a releasable attachment—using screws, a clamp, or other means known to one of skill in the art—or a permanent attachment—using welds, or by forming the skirting holder 17 integrally with the transverse member 14, for example. Embodiments in which the skirting holder 17 is detachable have several advantages; for example a longer or shorter skirting holder 17 may be attached as the user requires, various types of skirting material 12 may be accommodated, the skirting holder 17 may be angled or curved, a damaged skirting holder 17 may be easily removed and replaced, and the caster skirting assembly 10 (FIG. 3) may be cheaper and easier to manufacture. The skirting holder 17 may extend the full length of the transverse member, as suggested in FIG. 1, or it may be shorter, or even much longer than the transverse member (thus sweeping much of the ground beneath the cart or other caster-wheeled item as the cart or item is pushed along.)

The skirting holder 17 may also include a skirting attachment mechanism 30, which may be for example a clamp, a ridged slot, or other means known to one of skill in the art of attaching a caster skirt. The skirting attachment or skirting clamp 30 may in some embodiments be integrally formed with the transverse member 14 (FIG. 3), in which case the caster skirting assembly 10 (FIG. 3) may not include a skirting holder 17.

Wherever placed, the skirting clamp or skirting slot or skirting attachment mechanism 30 may be adapted to receive a skirting material 12. In the pictured embodiment, the skirting material 12 may be easily slid into the skirting slot 30 along the line of the arrow. The skirting material 12 may easily be removed and replaced once the skirting material 12 has become worn or damaged.

The skirting material 12 may have a length equal to the skirting attachment mechanism 30, or may in some embodiments be narrower or wider. In such embodiments, some debris may be more effectively swept to one side and out of the way of the caster wheel, because the center of the skirting material may be stiffer than the edges.

In some embodiments, the skirting material 12 may not be entirely of the same texture or material, but may rather include pre-frayed or scored edges or different types of fibers, or thicker or reinforced centers, thus encouraging debris to more gently move aside so that said debris does not bounce upwards. The skirting material 12 may also be layered, for example to include softer bristles towards the leading edge of the skirting material and stiffer ones towards the back.

The present disclosure further contemplates methods for constructing a caster wheel skirting device which does not interfere with a caster wheel locking mechanism.

For example, in one embodiment, the method comprises first selecting a cut shape of metal having two ends, shaping the metal at a first of the two ends to form a transverse member, shaping the metal at a second of the two ends to form a rotational stop or tab, affixing a skirting material to the transverse member, and mounting the cut shape of metal on a caster wheel having a locking mechanism.

Figure 5:
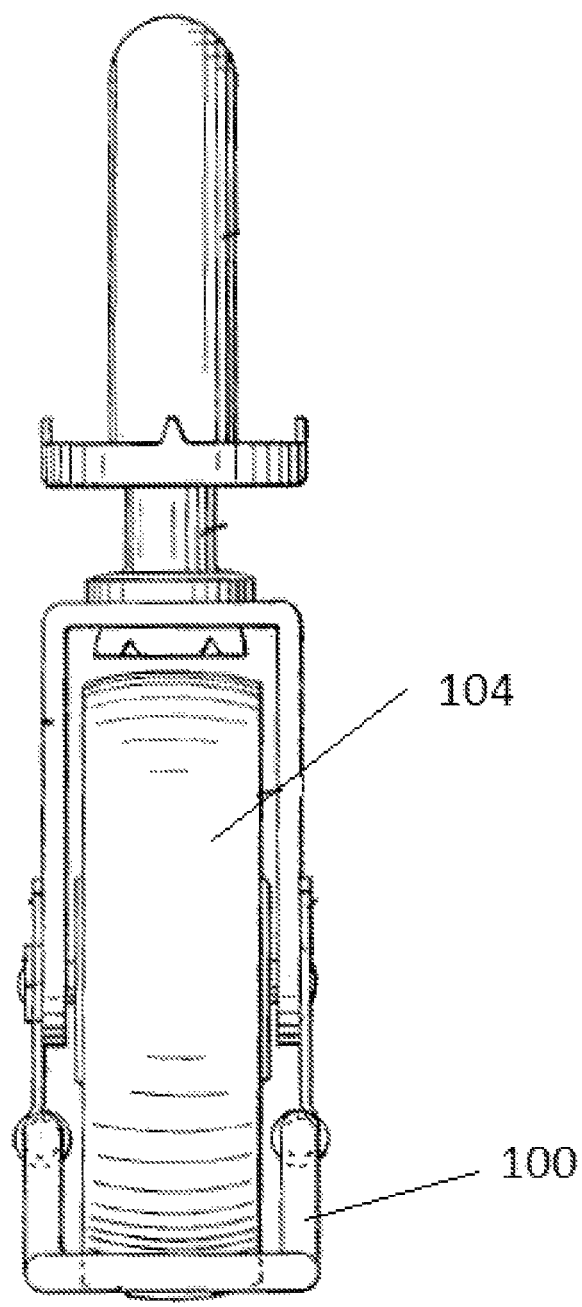
FIG. 5 shows a configuration common in the prior art, in which the caster guard assembly substantially surrounds the front of the caster wheel.

Turning now to FIG. 5, there is shown a front view of a wheel guard configuration common in the prior art, in which the caster guard assembly 100 substantially surrounds at least the front of the caster wheel 104, and occupies both sides of the wheel's axle.

Those skilled in the art will recognize various modifications which could be made to the embodiments disclosed herein without departing from the scope and spirit of the invention. The following claims are intended to cover such modifications.

The invention claimed is:

1. A skirt assembly comprising:
   a first arm portion having a stop tab and an axle attachment, the first arm portion being joined to a second arm portion, the second arm portion having a transverse member at substantially right angles to the second arm portion, the transverse member having a skirting clamp; and
   a skirt attached to the skirting clamp.

2. The skirt assembly of claim 1, wherein the skirting clamp comprises a ridged groove, and further comprising a skirting material, the ridged groove being adapted to releasably engage the skirting material.

3. The skirt assembly of claim 2, wherein the stop tab has a width and a length, the stop tab width being less than approximately one half inch, and the stop tab length being less than approximately one half inch.

4. The skirt assembly of claim 1, further comprising a wheel axle, the wheel axle having a first end and a second end; and
   wherein the axle attachment is adapted to releasably engage the wheel axle at only the first end.

5. The skirt assembly of claim 4, wherein the transverse member is heavier than the first arm portion.

6. The skirt assembly of claim 1, wherein the transverse member and the stop tab are substantially parallel; and the first arm portion and the second arm portion are substantially co-planar.

7. A lockable skirted caster wheel assembly comprising:
   a caster wheel having a frame, a locking mechanism for preventing rotation of the caster wheel, and an axle, the axle having a first end and a second end, the axle attachment having a first arm portion and a second arm portion, the second arm portion being longer than the first arm portion, the first arm portion being adapted to engage the frame of the caster wheel and the the second arm portion being bent to form a transverse member; and a skirting material connected to the axle attachment, the axel attachment being engaged with only the first end of the axel.

8. The lockable skirted caster wheel assembly of claim 7, wherein: the second arm portion and the transverse member meet at an angle, the angle being substantially ninety degrees, the skirting material being attached to the transverse member.

9. The lockable skirted caster wheel assembly of claim 7, wherein the transverse member further comprises a skirting holder, the skirting holder being affixed to the transverse member at an attachment point.

10. The lockable skirted caster wheel assembly of claim 9, wherein the skirting holder further comprises a skirting clamp.

11. The lockable skirted caster wheel assembly of claim 10, wherein the skirting clamp comprises a ridged slot; and wherein the skirting material has a bulbous side, the bulbous side being adapted to slide removeably into the ridged slot.

12. The lockable skirted caster wheel assembly of claim 10, wherein the skirting holder is curved.

13. The lockable skirted caster wheel assembly of claim 9, wherein the skirting holder meets the transverse member at a skirting angle, the skirting angle being more than about ten degrees.

14. The lockable skirted caster wheel assembly of claim 7, wherein the axle attachment is releasably attached to the axle.

15. The lockable skirted caster wheel assembly of claim 7, wherein the transverse member is wider than the first arm portion.

16. A method for constructing a wheel skirt, comprising:
   (a) providing a caster skirt assembly having a first arm portion having a distal tab and a second arm portion having a distal portion with a skirting material attached thereto;
   (b) positioning the distal portion of the second arm portion at an angle to the planar surface;
   (c) positioning the distal tab of the first arm portion at an angle to the planar surface;
   (d) forming an axle attachment at a juncture of the first arm portion and second arm portion;

(e) providing a wheel having an axle therethrough; the axle having a first end and a second end;

(f) engaging the first end of the axle with the axle attachment so that the skirting material is disposed adjacent the wheel.

17. The method of claim 16, wherein a skirting holder is attached to the distal end of the second portion.

18. The method of claim 16, further comprising the steps of:

(g) providing a wheel lock;

(h) engaging the second end of the axle with the wheel lock.

19. The method of claim 16, further comprising the steps of:

(g) providing a wheel frame;

(h) selectively engaging the distal tab of the first arm portion with the wheel frame.

20. The method of claim 16
wherein the method comprising attaching the first arm portion and the second arm portion to one end of the axel via a fastener and a locking mechanism which inhibits rotation of the wheel to an opposing end of the axel.

\* \* \* \* \*